United States Patent [19]
Double et al.

[11] Patent Number: 5,159,629
[45] Date of Patent: * Oct. 27, 1992

[54] DATA PROTECTION BY DETECTION OF INTRUSION INTO ELECTRONIC ASSEMBLIES

[75] Inventors: Glen P. Double, Concord, N.C.; Steve H. Weingart, Peekskill, N.Y.

[73] Assignee: International Business Machines Corp., Armonk, N.Y.

[ * ] Notice: The portion of the term of this patent subsequent to Jun. 25, 2008 has been disclaimed.

[21] Appl. No.: 693,991

[22] Filed: Apr. 29, 1991

Related U.S. Application Data

[63] Continuation-in-part of Ser. No. 405,910, Sep. 12, 1989, Pat. No. 5,027,397.

[51] Int. Cl.$^5$ .............................................. H04L 9/00
[52] U.S. Cl. .................................... 380/4; 380/52; 307/202.1; 206/807
[58] Field of Search .................... 380/3, 4, 52, 59; 307/202.1; 206/807; 357/72, 74, 75, 84; 365/59, 61, 53

[56] References Cited

U.S. PATENT DOCUMENTS

| | | | |
|---|---|---|---|
| 3,594,770 | 7/1971 | Ham et al. | 340/273 |
| 3,851,602 | 12/1974 | Lamping | 109/23 |
| 4,413,327 | 11/1983 | Sabo et al. | 364/900 |
| 4,446,475 | 5/1984 | Gerceki et al. | 357/40 |
| 4,593,384 | 6/1986 | Kleijne | 365/228 |
| 4,639,826 | 1/1987 | Val et al. | 361/272 |
| 4,691,350 | 9/1987 | Kleijne et al. | 380/3 |
| 4,807,284 | 2/1989 | Kleijne | 380/3 |
| 4,811,288 | 3/1989 | Kleijne et al. | 365/52 |
| 4,813,564 | 3/1989 | Cooper et al. | 206/807 X |
| 4,860,351 | 8/1989 | Weingart | 380/3 |
| 4,882,752 | 11/1989 | Lindman et al. | 380/25 |
| 4,933,898 | 6/1990 | Gilberg et al. | 380/38 |
| 5,027,397 | 6/1991 | Double et al. | 380/4 |
| 5,053,992 | 10/1991 | Gilberg et al. | 365/53 |
| 5,072,331 | 12/1991 | Theile et al. | 365/53 X |

OTHER PUBLICATIONS

James Unger; Herman Comic Strip; Universal Press Synidicate; Jun. 26, 1991.

*Primary Examiner*—Tod R. Swann
*Attorney, Agent, or Firm*—Calfee, Halter & Griswold

[57] ABSTRACT

The present invention provides an intrusion barrier for protecting against mechanical or chemical intrusion into an electronic assembly, especially one containing volatile memory. It includes a screen material surrounding the electronic assembly which screen material has formed thereon fine conductive lines in close proximity to each other. The lines are formed of conductive particles of material dispersed in a solidified matrix of a material which loses its mechanical integrity when removed from the screen. An electrical supply and signal detection circuit is provided which generates an output signal responsive to a given change in resistance of the conductive lines, such that if the resistance changes are a result of a mechanical or chemical attack, a signal is generated which can cause the erasure of the volatile memory. Also, radiation detection and temperature sensing circuits are provided to cause erasure of the volatile memory responsive to detection of a given intensity of radiation or a temperature below a given value.

19 Claims, 9 Drawing Sheets

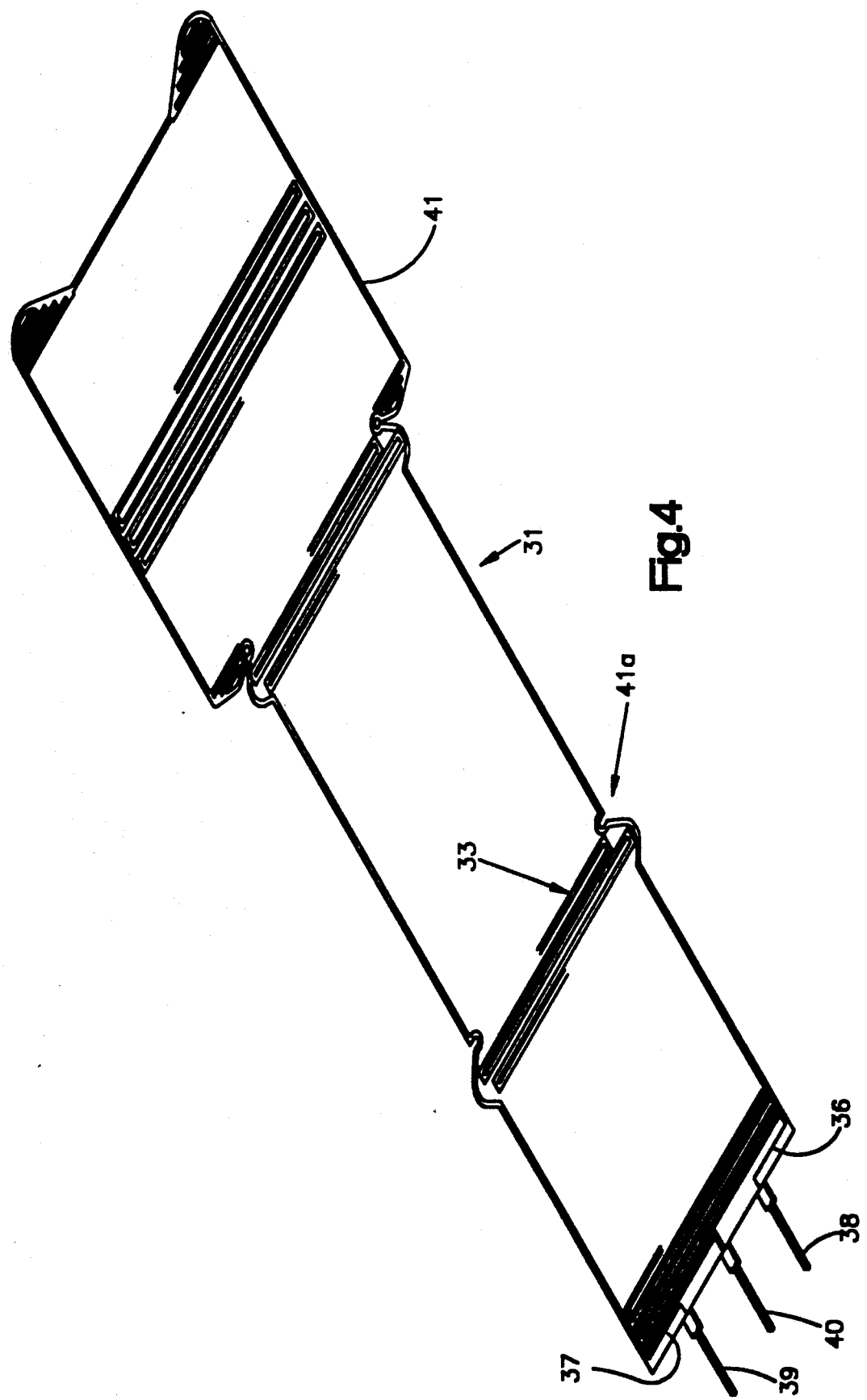

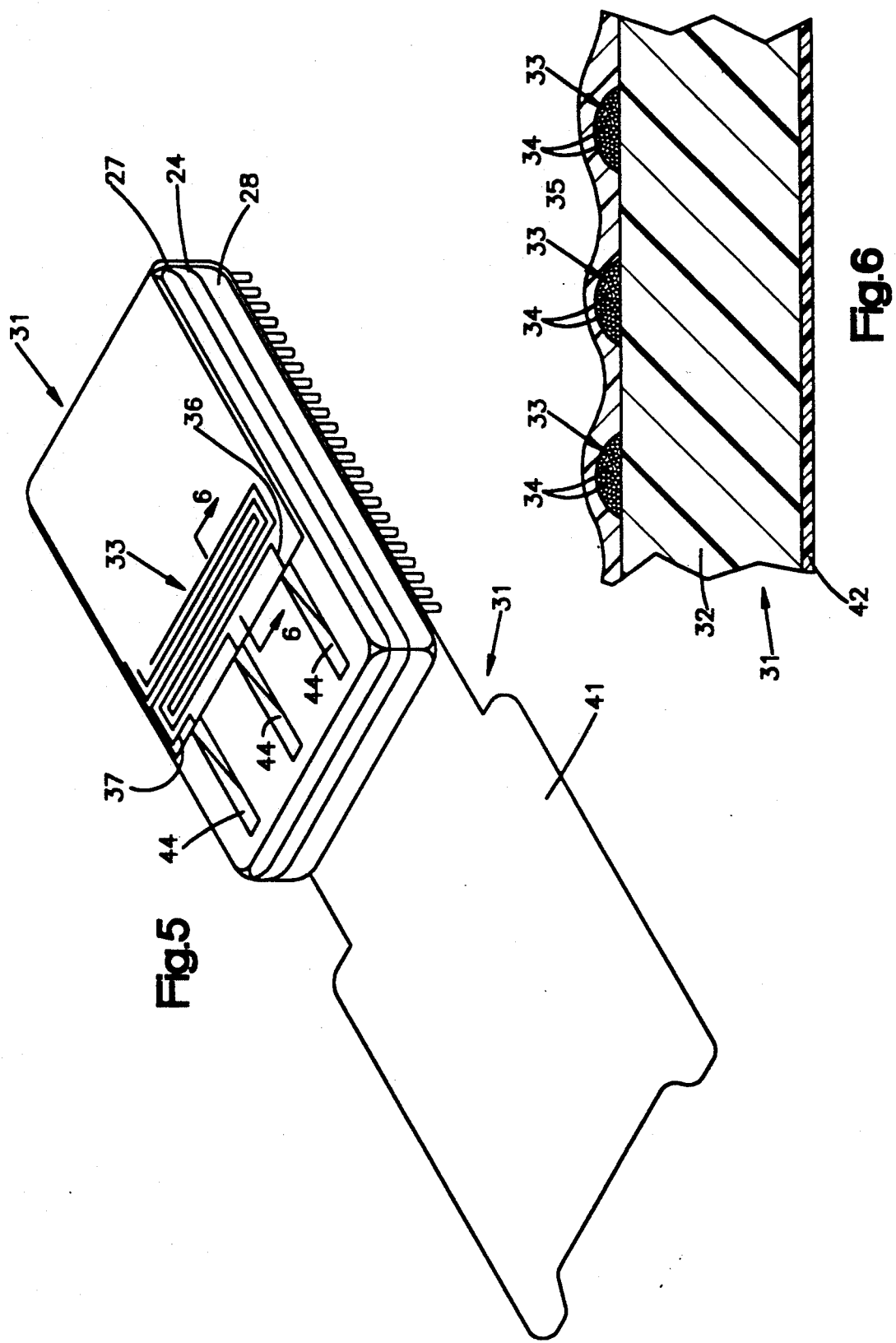

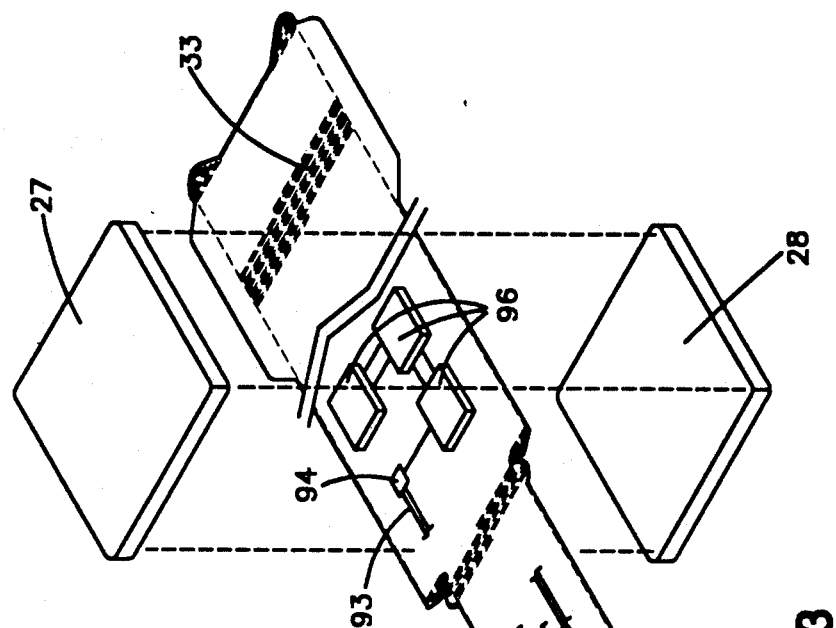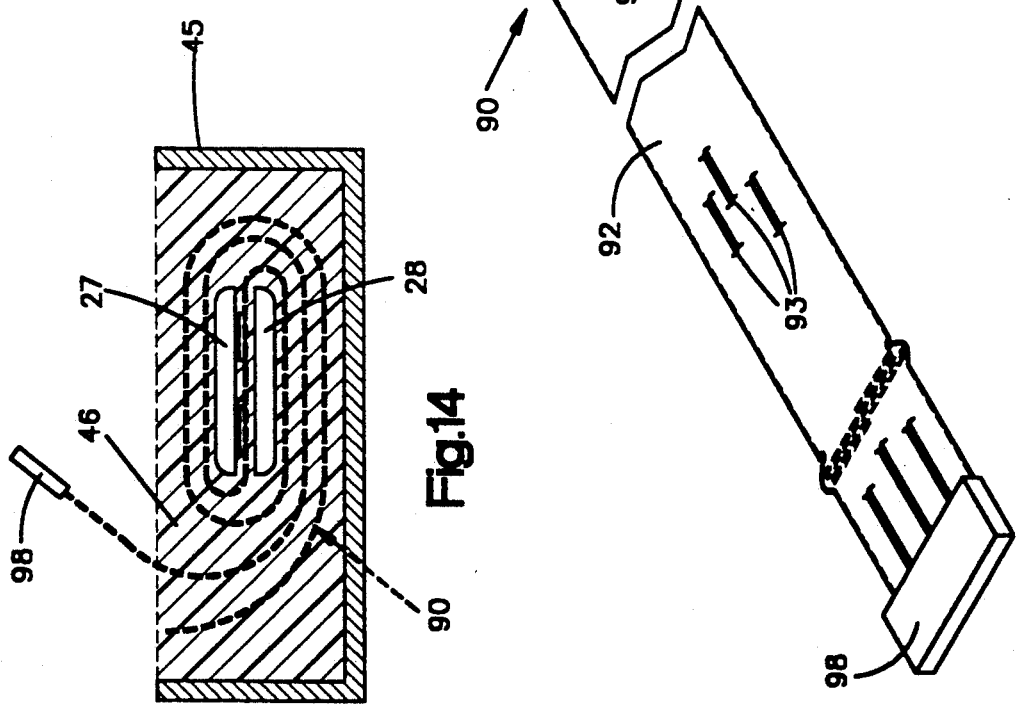

DATA PROTECTION BY DETECTION OF INTRUSION INTO ELECTRONIC ASSEMBLIES

This application is a continuation-in-part of application Ser. No. 405,910 filed Sep. 12, 1989, which was allowed on Dec. 4, 1990 now U.S. Pat. No. 5,027,397.

BACKGROUND OF THE INVENTION

Field of the Invention

This invention relates generally to detection of intrusion into electronic assemblies, and more particularly, to the detection of intrusion by mechanical or chemical means for the purpose of reading the data stored in a memory.

In many computer applications, it is desirable to protect the contents of the computer memory from being unlawfully or unauthorizedly extracted and read. It is conventional practice to prevent reading of information electronically by providing certain encryption schemes wherein data is transmitted and received in an encrypted form and only authorized people who have the decryption key are able to read the data. There are many different types of encryption schemes which are useful in protecting the sensitive data against being read by unauthorized persons. Encryption keys and other sensitive data are often stored in I/C (integrated circuit) memory components within the computer. By use of software, the stored information is generally adequately protected from unauthorized persons using keyboard entries to attempt memory interrogation. However, an unauthorized person with the necessary skills and knowledge, and sufficiently motivated can bypass software controls and attack the computer hardware directly. There are many attacks some straight forward and well known, others more sophisticated, that allow direct interrogation of memory components and devices. One scheme of protection against such attacks is to provide some type of detecting means which detect any attempted mechanical intrusion into the sensitive area of the computer and, when such intrusion is detected an alarm is given and/or a signal is sent to circuitry, which circuitry erases the data, thereby preventing the compromise of the information which was stored in the computer memory components. Various schemes have been proposed which provide for some type of electronic or electrical grid surrounding the computer circuitry and, when this electrical grid is broken or breached, the requisite signal is generated. Schemes for such electronic detection are shown in U.S. Pat. Nos. 4,446,475 and 3,594,770. These types of systems, however, have several drawbacks. One such drawback is that many grids are susceptible to very careful mechanical manipulation to allow the memory device to be accessed without breaking or otherwise compromising the circuit. Also, certain of these systems are susceptible to a type of attack wherein the materials which support the electrical grid are chemically attacked leaving access areas exposed to circumvent the electrical grid thus allowing physical intrusion into the memory components.

Still other more sophisticated attacks, through temperature modification or though ionizing radiation (e.g. x-rays) affect volatile memory devices such that an erasure command is not effective, thereby allowing the electrical wrapping to be circumvented.

The present invention overcomes these defects by providing an outer intrusion detection layer that is highly resistant to chemical and mechanical attacks. Further, internal circuitry is provided to detect temperature and ionizing radiation attacks.

Use of detection for low temperatures to prevent tampering is shown in U.S. Pat. No. 4,593,384. Also, temperature responsive devices for safeguarding information are shown in U.S. Pat. No. 3,851,602. The use of means to limit effects of ionizing radiation are shown in U.S. Pat. No. 4,413,327 and 4,639,826. However, neither of these patents suggest any means of security protection and/or erasing of information responsive to high levels of radiation applied for purpose of attacking a volatile memory device to obtain sensitive information.

SUMMARY OF THE INVENTION

According to one aspect of the present invention, an intrusion barrier for protecting against mechanical or chemical intrusion into an electronic assembly is provided. The barrier includes a screen material surrounding the electronic assembly. The screen material has formed thereon fine conductive lines in close proximity to each other in a pattern that limits the mechanical access which can be achieved without disturbing the resistive characteristics of at least one line or line segment. The lines are formed of conductive particles of material dispersed in a solidified matrix of material which loses its mechanical integrity when removed from the screen substrate. Electrical supply and signal detection means are provided which are adapted to supply a signal to the conductive lines and generate an output signal responsive to a given change in the resistance of the conductive lines whereby, when the resistance of the conductive lines changes, either as result of chemical attack or mechanical attack, a signal is generated. This signal can be made to cause the erasure of information in the memory component. In other aspects of the present invention, radiation detection means are provided which generate a signal when radiation is detected above a given intensity and which signal is utilized to cause the erasure of information contained in the memory component before the radiation has reached a level adequate over a reasonable period of time to prevent erasure. In still further aspects, the invention includes temperature sensing means which generates an electrical signal responsive to a temperature which is lower than a predetermined value and which signal is used to cause the erasure of information contained in the memory component, before the temperature of the memory component has reached a temperature low enough to cause a significant number of its storage locations to retain their information even after erasure is attempted.

DESCRIPTION OF THE DRAWING

FIG. 4 is a perspective view, somewhat diagrammatic showing a flexible screen member used in this invention;

FIG. 5 is the system of FIG. 3 showing the flexible screen member partially wrapped thereon with screen leads attached to the circuit card;

FIG. 6 is a sectional view taken substantially along the plane of line 6—6 of FIG. 5;

FIG. 13 is a perspective view showing another embodiment of the present invention wherein the various components are mounted on a flexible circuit; and FIG. 14 shows the flexible circuit and components rolled up and encapsulated in a container.

DESCRIPTION OF THE PREFERRED EMBODIMENT

Figure 1:
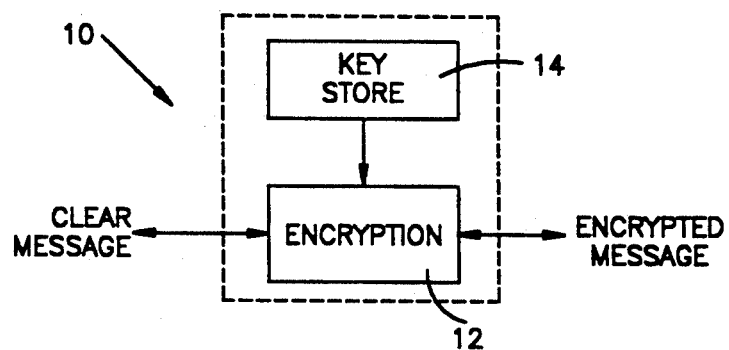
FIG. 1 is a schematic view of a message encryption/decryption system.

Referring now to the drawings and for the present to FIG. 1, a conceptual schematic drawing of a message encryption decryption facility is shown in broken outline 10. The clear message which is to be encrypted is delivered to encryption means 12 which in turn encrypts the clear message using a key which has been stored in the key store 14 to provide an encrypted message. The encryption keys in key store 14 as well as the encryption mechanism 12 must be protected from interrogation because if an unauthorized person were to have access to these keys and the encryption process, the clear messages could be derived from encrypted data and misused indiscriminately.

Figure 2:
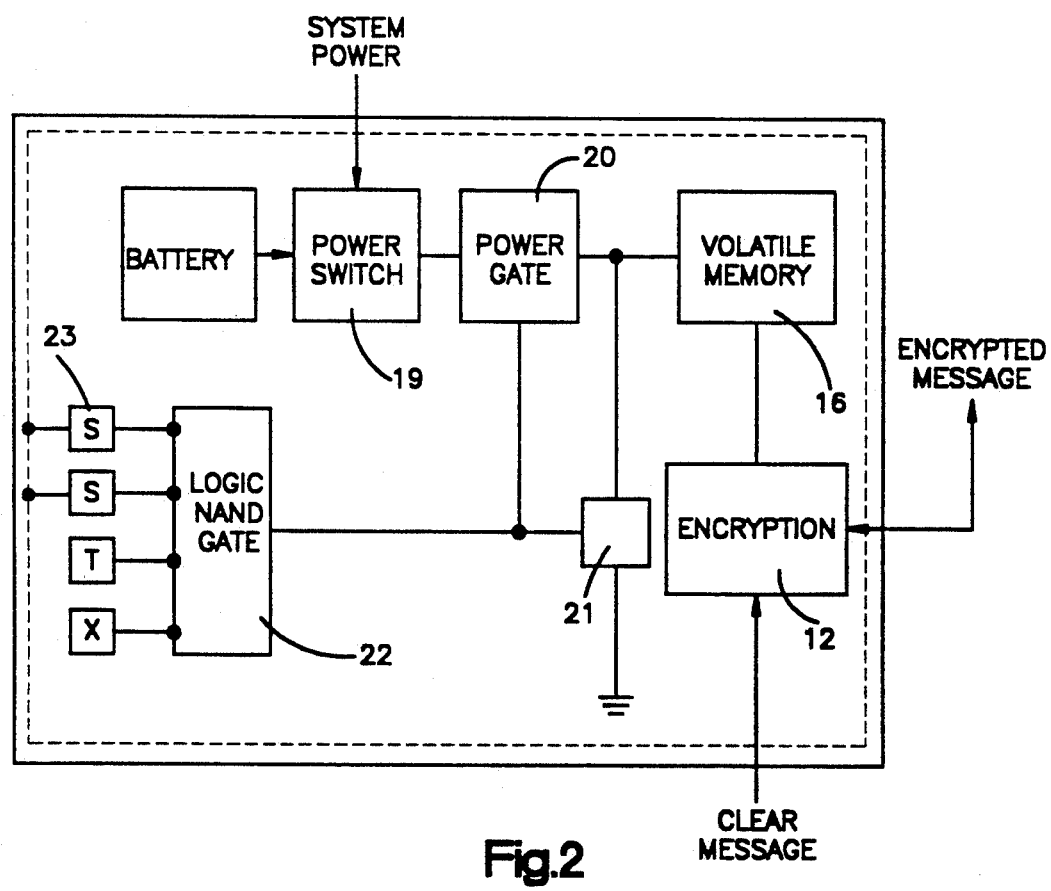
FIG. 2 is a schematic view of the operation of the encryption/decryption system and means to detect and prevent unauthorized interrogation of the system.

The conceptual block diagram in FIG. 2 shows the scheme of the present invention for detecting and preventing unauthorized interrogation of the stored encryption keys in key store 14. For the purpose of this invention, the encryption keys are retained in a volatile memory 16. The volatile memory 16 is powered by either a battery or system power determined by power switch 18. Power to the memory is controlled by power gate 20 and shorting transistor 21 via detection logic NAND gate 22 which in turn is actuated by sensor circuits designated S, T and X. (Of course, more sensor inputs could be used if desired.) Sensor circuit S, which will be described presently in detail, detects mechanical or chemical intrusion; sensor circuit T, which will be described presently in detail, detects temperature excursions; and sensor circuit X, which will be described presently in detail, detects exposure to radiation. As is well known in the art, the logic NAND gate 22 will normally be in the "low" or "off" condition if all inputs are "on" or "high"; however, if any input goes "low", then the NAND gate output 22 goes "high" providing a signal to other components attached to it. Such a signal from the NAND gate output will cause the power gate 20 to disconnect the memory 16 from power and cause shorting transistor 21 to short the power pin of the memory to ground thus erasing the memory quickly. Thus, if any one of the sensor inputs changes from "high" to "low", as a result of certain predetermined conditions indicating an attack the NAND gate 22 will turn ' on" and the data from memory 16 will be quickly erased. Each of these particular detecting circuits will be described presently.

Figure 3:
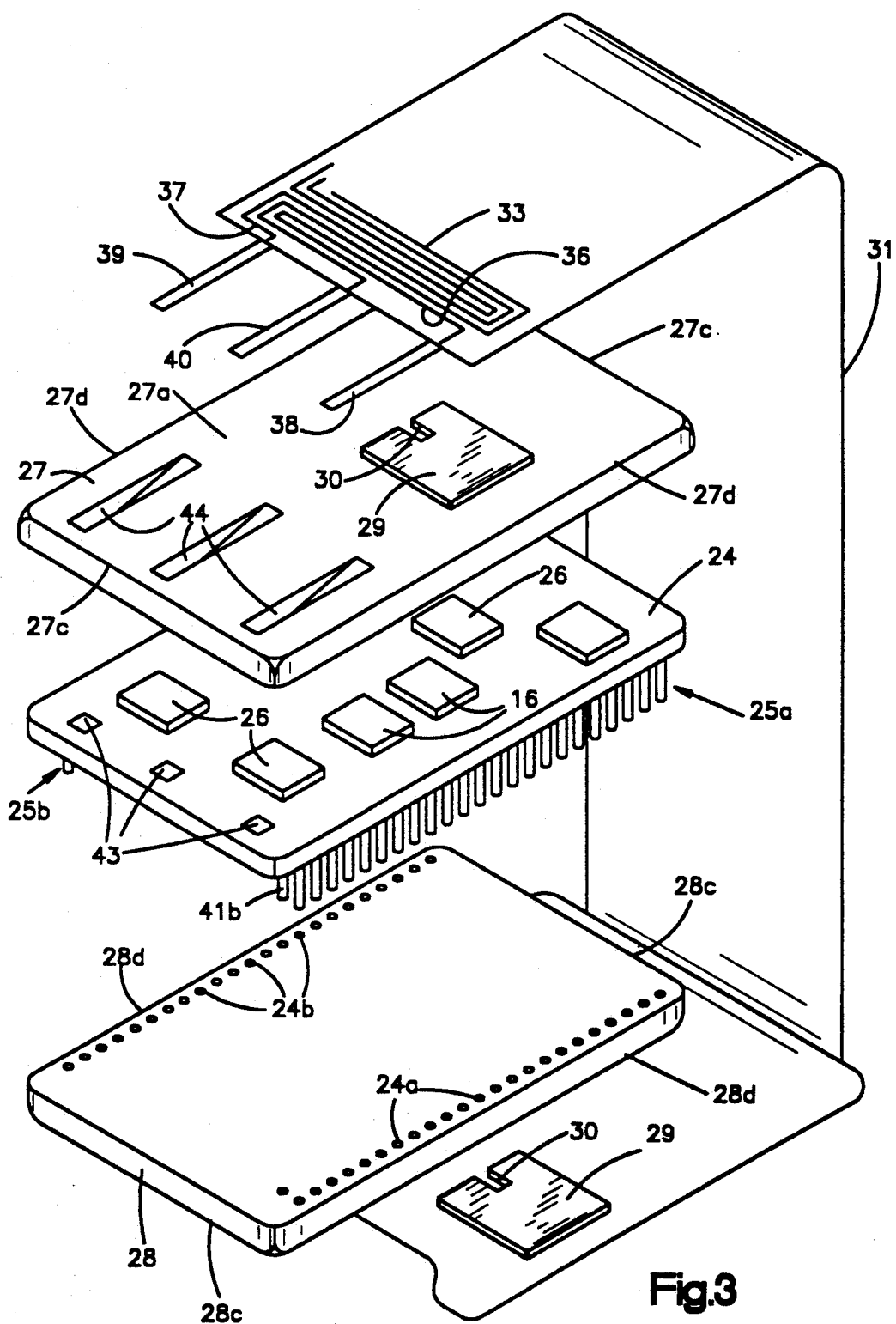
FIG. 3 is an exploded perspective view of a circuit card with various devices and components mounted thereon which constitute the system to be protected, and, showing plastic preforms which mate with the card to provide the form-factor for wrapping the flexible screen membrane.

As shown in FIG. 3, a circuit card 24 is provided which contains thereon the various components for encryption, key storage in volatile memory 16, and the protection circuitry for the volatile memory for the encryption/decryption facility 10. The components other than the volatile memory 16 are designated generally as 26, all being shown conceptually. The specific location, number and function are not critical to this invention. First and second rows of pins 25a and 25b respectively project from the circuit card 24 which are connected to the components by electrical circuitry (not shown) to provide input/output signals and power and ground voltage levels. This electronic assembly could also be comprised of a single chip with the circuitry formed thereon.

Disposed over each side of the circuit card 24 are a pair of plastic preforms 27 and 28 which fit over the components and provide the proper control surface or form-factor for the wrapping of the screen member which will be described presently. The preforms, 27 and 28 which serve to provide the proper control surface and form factor for wrapping the screen member have smooth, preferably planar surfaces 27a and 28a respectively to provide generally smooth surfaces against which a screen member (as will be described presently) can lie in a flat configuration. Further each of the preforms has rounded or curved end surfaces 27c and 28c respectively and rounded or curved side surface 27d and 28d respectively. These rounded or curved configurations are for the purpose of preventing creasing of the screen member which could cause breaks in the conductive lines on the screen when it is wrapped therearound as will be described presently. The preforms 27 and 28 have openings as required (e.g. 27e in FIG. 9) to receive the components, and thus each of the preforms is in contact with the card surface and not the components. Thus, the preforms also provide a controlled distance of the screen above the highest component of the card and also keep the screen away from any sharp edges of the components. If the circuit card 24 employs pins, then holes 24a and 24g (FIG. 3) or slots 24c and 24d (FIG. 3A) to receive such pins are provided in preform 28. Patterned lead foil sheets 29 are placed on the plastic preforms 27 and 28 so as to provide a radiation shield on both sides of the volatile memory storage components 16. If desired, the lead foil sheets may also be placed in depressions conformed in the preform 27, 28. The lead foil sheets preferably have adhesive backing, allowing them to be secured to the preforms and maintained in the selected position. The foil sheets 29 have cut out portions 30 to accommodate the positioning of a radiation sensor as will be described presently. The circuit card 24, the preforms 27 and 28 and the lead sheets 29 are all stacked in superimposed relationship so as to receive a screen member 31 (FIGS. 3 through 6) wrapped therearound which will form the barrier against any unauthorized attempts at mechanical or chemical intrusion to the circuit card 24.

As seen in FIGS. 4 through 6, the screen member 31 is comprised of a tough flexible substrate such as film 32 of Mylar (a trade mark of E. I. DuPont Co. for polyethylene terepthalate) having a serpentine pattern of screened conductive lines 33 thereon. The lines 33 ar comprised of conductive particles 34 such as particles of silver and carbon which are dispersed in an organic substance such as polyvinyl chloride. These lines 33 are screened onto the Mylar film by conventional screening processes and are sufficiently close together and of a size to provide a deterrent to mechanical probing of the circuit card. A preferred geometry comprises lines 0.25 mm wide and 0.013 mm thick and spaced on about 0.5 mm centers. A thin acrylic film 35 (FIG. 6) over the lines 33 provides environmental protection to the lines, from such things as moisture and atmospheric contaminants or scratching. Referring to FIG. 4, the lines 33 are screened onto the substrate 32 by conventional screening techniques in a serpentine pattern such that they form two legs or segments 36 and 37 of substantially equal resistance, one leg 36 terminating in an electrical contact 38 and the other leg 37 terminating in an electrical contact 39, both legs 36 and 37 having a common center electrical contact 40. Two legs 36 and 37 will act as two resistance legs in a bridge circuit, which will be described presently.

The screen is formed with a pair of side flaps 41 which serve to protect the edges of the circuit card as will be described presently.

The substrate 31 is also preferably provided with an adhesive backing 42, and as shown in FIG. 5, the screen member 31 is partially wrapped around the superimposed circuit card, plastic preforms and lead strips. The screen preferably is provided with an alignment notch 41a (FIG. 4) which will coact with an alignment pin 41b formed on the card 24 (FIG. 3). This, together with pins 25a and 25b will assure proper alignment of the screen 21 on the preforms 27, 28 and card 24.

Figure 7:
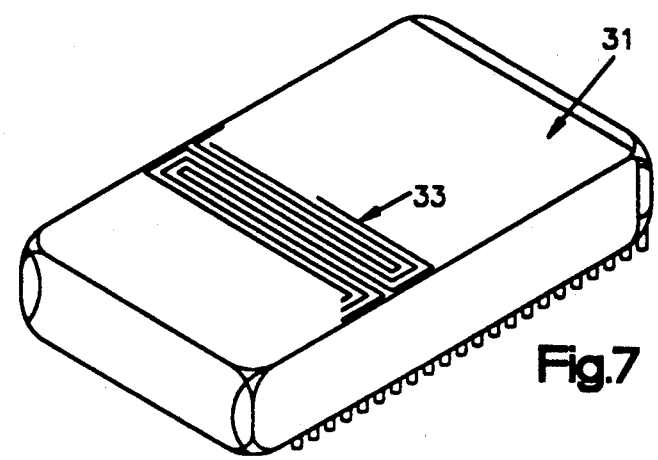
FIG. 7 is a view similar to FIG. 5 in which the screen is wrapped onto the circuit card with parts broken away for clarity.
Figure 8:
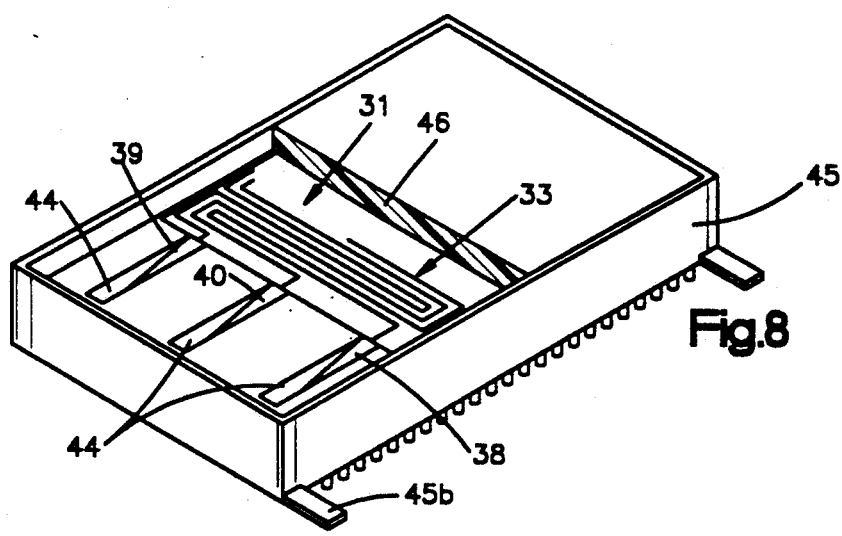
FIG. 8 is a view similar to FIG. 6 showing the assembly encapsulated in epoxy and contained in a steel container.
Figure 9:
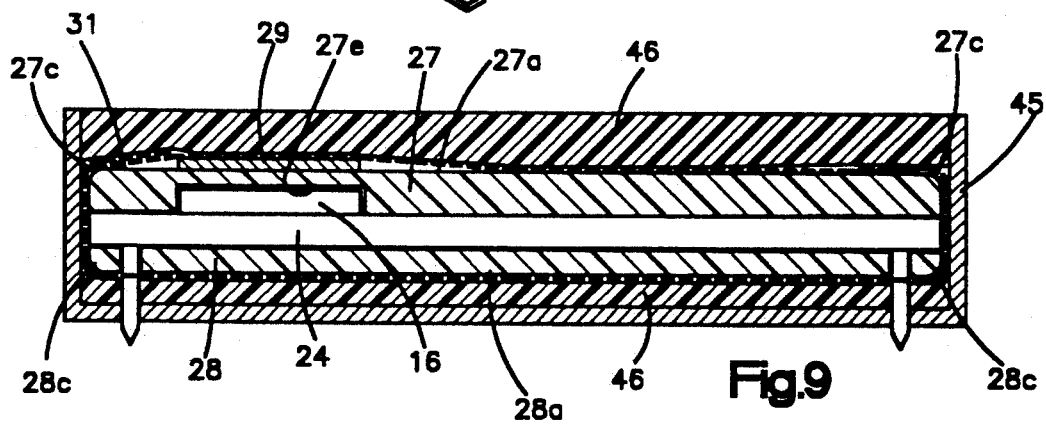
FIG. 9 is a sectional view taken substantially along the plane of line 9—9 of FIG. 8.
Figure 9A:
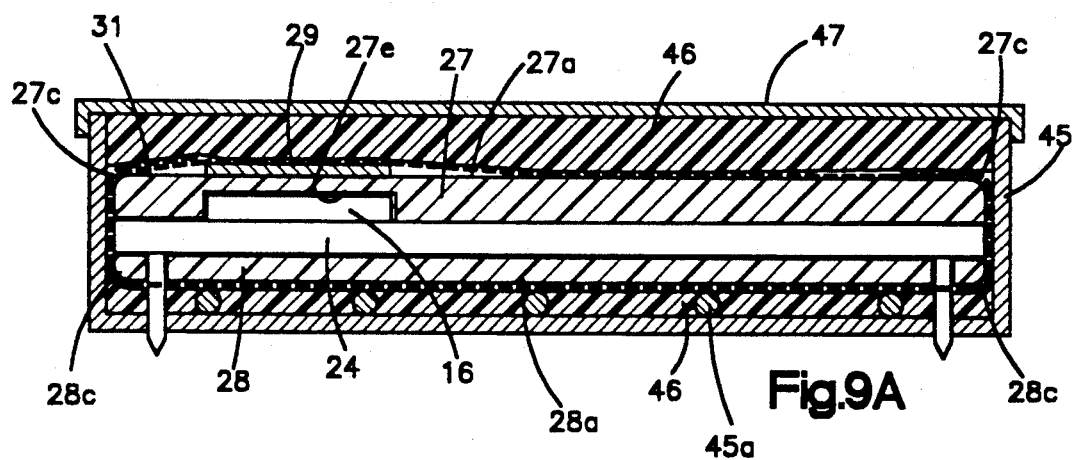
FIG. 9A is a sectional view similar to FIG. 9 showing a different embodiment of the encapsulation feature of the present invention.

The electrical contacts 38, 39 and 40 are connected to their respective terminals 43 on the circuit card 24 through openings 44 in the preform 27. These terminals 43 are mainly schematic or conceptual representations of the contact points on the card 24 to connect to the circuit shown in FIG. 10. The remaining portion of the screen membrane is then wrapped around completely to cover the screen contacts and the side flaps 41 are folded over the preform sides as shown in FIG. 7. This configuration provides a card with components thereon which is essentially completely enclosed with a screen that has conductive lines formed thereon with the adhesive 42 providing a bond to the preforms 27 and 28. The assembly shown in FIG. 7 is then placed in a steel container 45 and surrounded with an encapsulant coating (FIGS. 8 and 9). A preferred technique of encapsulating the preform and card assembly in the container 45 is to first place a thin film of encapsulant in the container 45. Following this, the card-preform assembly can be placed directly on the thin film and the remainder of the encapsulant added, to form the structure shown in FIG. 9. However, an alternative technique is to insert a plurality of thin plastic spacer rods 45a in the thin film before it cures. These spacer rods will provide a standoff for the card-preform assembly from the wall of the container 45. Following this, the card preform-assembly with the screen wrapped therearound is placed into steel container 45 and the remainder of the encapsulant is then added. The encapsulant is allowed to cure to provide this final encapsulated structure as shown in FIG. 9A. Also, as shown in FIG. 9A, a stainless steel cover 49 can be placed over the container 45. The container may have ground contacts 45b (FIG. 8) which are connected by solder contacts (not shown) to an external ground.

Figure 3A:
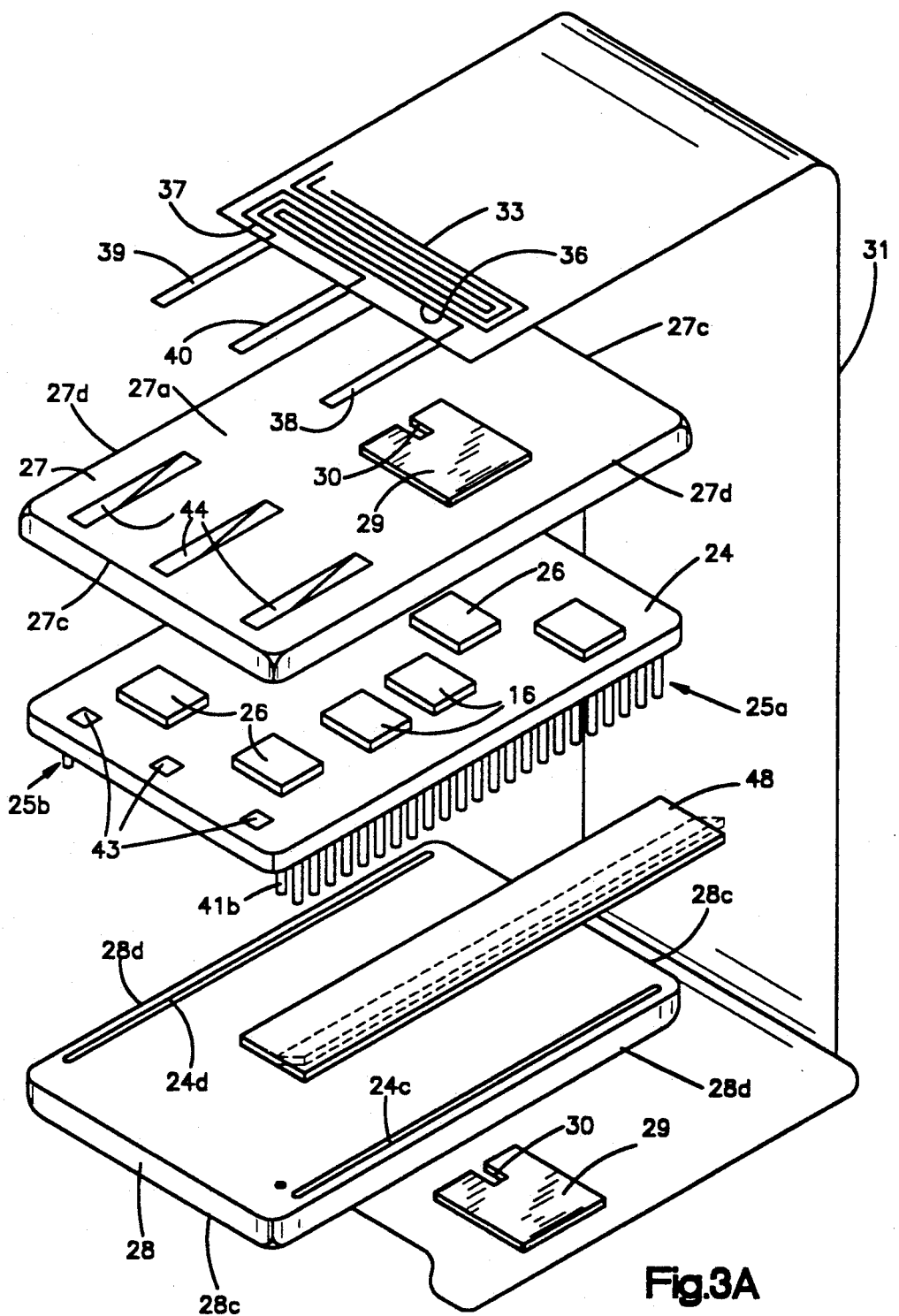
FIG. 3A is an exploded perspective view similar to FIG. 3 of another embodiment of the invention utilizing a circuit card and component member thereon, showing a modification of the plastic preforms.

If as described previously, the preforms 27 and 28 have slots 24c and 24d (rather than holes) through which the pins 25a and 25b project as shown in FIG. 3A, then an adhesive backed film barrier 48 can be placed over the pins and around the curved edges of the preforms to prevent liquid encapsulant from running into the slots. The wrapping of the barrier 48 is shown in broken outline in FIG. 3A.

Required characteristics of the encapsulant are that it must be mechanically tougher than the screen member, and chemically more durable or chemically similar to the screen member such that chemical or mechanical attacks including solvent attacks on the encapsulant are likely to damage the screen member. Expressed another way, the encapsulant should be at least as durable chemically and at least as tough mechanically as the screen member. Additional desirable properties are low shrinkage during curing, good adhesion to the screen member and opaque to visible light. A preferred encapsulant is Stycast 2651 epoxy manufactured by Emerson and Corning Inc. of Waburn, Mass.

The epoxy 46 becomes very hard and brittle upon curing as shown in FIGS. 8 and 9. The epoxy 46 is chosen such that it is harder and more brittle, and more rugged, tougher and more durable than the materials making up the screen number. Attempts to mechanically remove the epoxy 46 will result in a variety of fracture modes which will in turn cause lines 33 to break or rupture when the epoxy fractures. The bonding of the epoxy 46 to the screen is of a type such that it is extremely difficult to separate the epoxy mechanically from the screen without disrupting the underlying lines 33. Further, the strength of the bond of the epoxy 46 to the lines 33 is stronger than the strength of the bond of the lines 33 to the substrate 32 and thus is even more likely to thwart any attempted mechanical intrusion through the epoxy 46 and screen 31 to get to the volatile memory components 25. The epoxy material 46 is chosen such that the epoxy and the materials making up the screen number 31 are both subject to attack by similar solvents or reagents, and thus attempts to dissolve the epoxy 46 are highly likely to result in chemical attack of the lines 33 by the solvent which will cause changes in resistance which may even become either shorts, or opens in the lines 33.

Another satisfactory encapsulant is Conathane EN-2523, a polyurethane, manufactured by Conap Corp. of Olean, N.Y. Acrylic and polyester materials may also be utilized as encapsulants.

The container 45 and when used, the cover 47 provides a degree of EMI shielding for the circuit card 24 components.

The previously described embodiment utilizes two rows of pins as input/output power and ground connections; however, conventional flat cable or other types of means such as optical communications can be used for I/0 and power, thus eliminating the need for pins. If optical I/0 is used for signal and power, conventional optical I/0 coupling devices and a photoelectric energy conversion device would be added to the circuit card 24.

Figure 10:
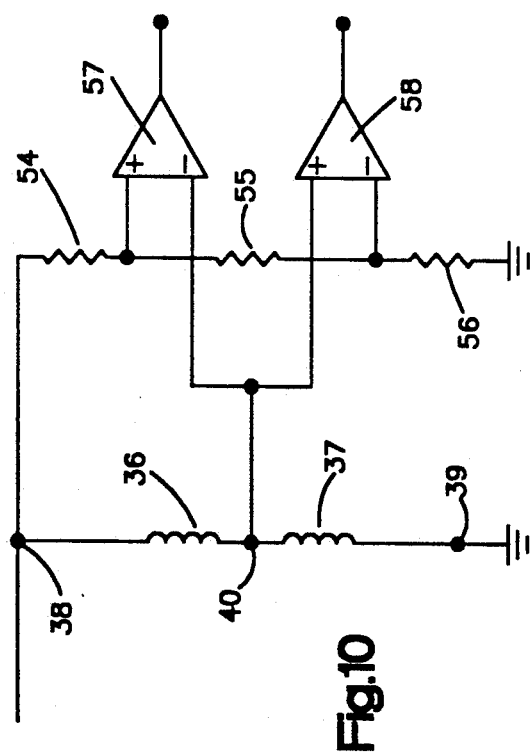
FIG. 10 is a circuit diagram of a circuit used for detecting mechanical or chemical intrusion through the screen member.

The contacts 38, 39 and 40 are attached to a circuit for the Sensor S through terminals 44 on the card 24 as shown in the circuit diagram of FIG. 10. The circuit includes resistor 54, 55 and 56 connected in series, and a pair of operational amplifiers 57 and 58. The negative input of operational amplifier 57 and positive input of operational amplifier 58 are connected to the center contact 40 of the lines 33. Contact 38 of line 33 is connected to system power or battery via power switch 18 and contact 39 of line 33 is connected to ground. The resistors 54, 55, and 56 are connected in series between system power or battery and ground. Resistors 54 and 56 are chosen to be of equal value. The value chosen for resistor 55 in relationship to the value of resistors 54 and 56 provides upper and lower bounds on the resistance differences between the legs 36 and 37 of the screen. The positive input of operational amplifier 57 is connected between resistors 54 and 55 and the negative input of amplifier 58 is connected between resistors 55 and 56. In this configuration, when the resistance of legs 36 and 37 of lines 32 are equal, both amplifiers 57 and 58 will be turned on. However, if the resistance of either leg 36 or 37 is substantially increased or decreased beyond the bounds set by resistor 55, the bias of the operation amplifiers 57 and 58 will change such that one or the other will turn "off" thus changing the input to NAND gate 22 from "high" to "low". As explained previously, this will cause the output of NAND gate 22 to go from "low" to "high", supplying the necessary signal to turn "off" power gate 20 and turn "on" shorting transistor 21 which will quickly erase the information stored in volatile memory 16. The change in resistance of legs 36 or 37 can be due either to breaks or shorts in either of the legs caused by an attempted intrusion, or by a slow change in resistance of the legs 36 or 37 caused by a chemical attack or by other means. Thus, the circuit shown in FIG. 10 will respond to attempted mechanical or chemical intrusions by sending a signal to the NAND gate 22 which in turn will send a signal to cause the erasure of information before the intrusion is complete and the volatile memory can be read.

As indicated previously, there are various special attacks whereby screen barriers can be thwarted, compromised, or by-passed without losing data or memory, if extra precautions are not taken. Two such attacks involve controlled exposure to ionizing radiation and, exposure to low temperatures. The circuitry shown in FIG. 11, detects both visible and ionizing radiation and causes the memory 16 to be erased before ionizing radiation is able to permanently affect the volatile memory. The circuit in FIG. 12 detects temperature excursions below a predetermined value and causes the memory to be erased before a critical low temperature affects the volatile memory.

Figure 11:
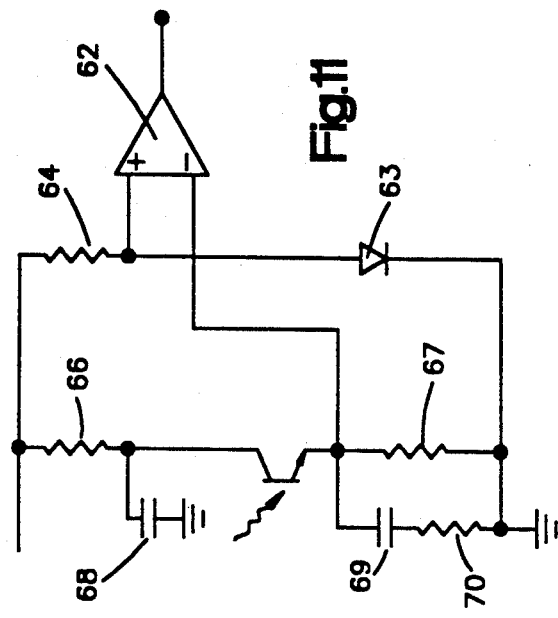
FIG. 11 is a circuit diagram of the circuit used for detecting and obtaining of data by use of high intensity radiation.

The circuit for Sensor X, which is responsive to both visible and ionizing radiation is shown in FIG. 11. This circuit includes an operational amplifier 62 having one side connected to diode 63 in series with a resistor 64, the combination of which provides a reference voltage to the positive input of the operational amplifier 62. The negative input of the operational amplifier 62 is connected between a photosensitive device 65, such as a Photo-Darlington pair or a phototransistor, and resistor 66 to system power or battery via power switch 18 and through resistors 67 to ground. Capacitors 68 and 69 and resistors 66 and 70 have been provided for noise filtering. The photosensitive device is located on the card 24 so that it is not blocked by the lead foil sheets 29, preferably adjacent to the volatile memory chip 16 under the notch 30 of the lead foil sheet such that attempted radiation of this component 16 will also expose the photosensitive device 65 to radiation. In normal operation, the photosensitive device 65 is nonconducting in the absence of radiation and the operational amplifier 62 is biased "on". However, when the photosensitive device senses radiation (either ionizing or in the visible spectrum) of sufficient intensity, it will conduct current which will change the bias on the operational amplifier 62 turning it "off". This will cause the NAND gate 22 to turn "on" and provide a signal to power gate 20 and shorting transistor 21 to cause information stored in volatile memory 16 to be erased as previously described.

Figure 12:
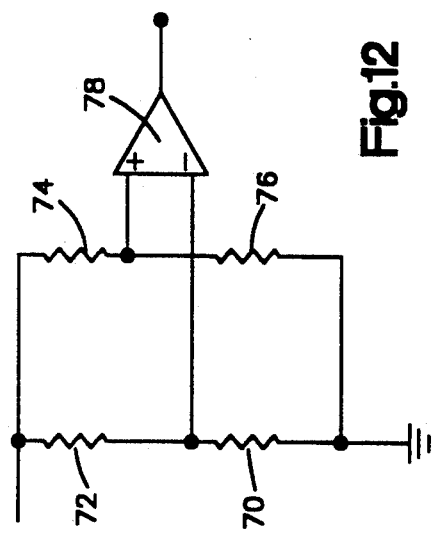
FIG. 12 is a circuit diagram of the circuit used for detecting and preventing obtaining of information by low temperature excursions.

The circuitry of Sensor T is shown in FIG. 12. In this circuit three resistors 72, 74 and 76, together with resistor 70, provide the four legs of a bridge circuit, which circuit is connected to operational amplifier 78. Resistor 70 is a thermistor having a negative temperature coefficient of resistance, i.e. its resistance increases with decreasing temperature. The value of the three resistors 72, 74 and 76 are chosen to bias operational amplifier 78 normally "on" within the operating temperature range, and to bias the amplifier "off" at a chosen temperature. The value of resistor 76 is chosen based on the temperature characteristics of thermistor 70. Thus in normal operation the operational amplifier 78 is normally biased "on", but when the temperature falls below a selected low value, e.g. 0 C. or −20C. or some other value related to the temperature dependent retention characteristics of volatile memory 16, the operational amplifier 78 will turn "off" which as described above, will cause the NAND gate to give a signal which will cause erasure quickly of the information stored in volatile memory 18.

Another embodiment of the invention is shown in FIGS. 13 and 14. In this embodiment, a flexible circuit member 90 is utilized. The flexible circuit member may be of the type that is manufactured by Minco Products of Minneapolis, Minn., which includes a supporting film 92 having circuit lines 93 and pads 94 formed thereon. The various circuit components designated generally as 96 are soldered or otherwise secured to the pads 94, as shown in FIG. 13. The opposite side of the film 92 has screened thereon lines 33 of the type and in the serpentine pattern as previously described. An acrylic coating (not shown) also as previously described is applied over the lines 33. In this case, the circuit serves as a support for the components, a support for the electrical circuitry and also as a support for the serpentine lines which are formed on the opposite sides. The flexible circuit member 90 is then rolled up and wrapped around a pair of preforms 27, 28, of the type previously described in a manner shown diagrammatically in FIG. 14. The rolled flexible circuit member supporting the components and wrapped around the preforms is encapsulated in an encapsulant 46 of a type previously described in a container 45 of the type those previously described as shown in FIG. 14. An input/output connector 98 is connected to the circuit pads 94. The intrusion detection circuits and connections are as previously described.

While several embodiments of this invention has been shown and described various adaptations and modifications may be made without departing from the scope of the invention as defined in the appended claims. For example, the NAND gate can be replaced with other logic circuits performing a logical "or" function to cause erasure of the memory if any one of a number of events are sensed indicating that an intrusion is being attempted. Additional sensors could be used to detect other evidence of intrusion.

What is claimed is:

1. A barrier in combination with an electronic circuit for protecting against intrusions into an electronic assembly including electronic components comprising;
   screen means surrounding said electronic assembly, said screen means including a flexible unitary membrane wrapped around the electronic assembly and line means formed on a substrate in a pattern that resists access without disturbing said line means,
   encapsulating material encapsulating said line means and bonded to said line means, said encapsulating material being at least as tough as the screen member and chemically similar or more durable than the screen member,
   and, electrical supply and signal detection means adapted to supply an input signal to said line means and generate an output signal responsive to a given change in said resistance of said line means; whereby when said resistance of said line means changes, a signal will be generated.

2. The electronic assembly as defined in claim 1 further characterized by preform means interposed between said components and said screen means and supporting said screen means.

3. The assembly as defined in claim 2 wherein said preform means included first and second sections, one disposed on each side of said components.

4. The assembly as defined in claim 3 wherein each of said sections has a smooth surface in contact with a portion of said unitary flexible membrane.

5. The assembly as defined in claim 4 wherein each of said sections have rounded side and end portions.

6. The assembly as defined in claim 3 wherein one of said sections includes slots to receive leads from said screen.

7. The assembly as defined in claim 3, wherein screen means includes a main body portion, and flap portions to completely enclose said preforms.

8. The assembly as defined in claim 2 wherein said electronic assembly includes a circuit card with components mounted thereon.

9. The assembly as defined in claim 8 including alignment means coactable between said screen and said card to provide alignment of the screen on said preforms.

10. The assembly as defined in claim 9 wherein said alignment means includes an alignment opening on said screen and an alignment pin extending from said preform.

11. The assembly as defined in claim wherein said electronic assembly includes flexible circuit means with said components mounted thereon.

12. The assembly as defined in claim wherein said flexible circuit includes a flexible membrane with circuitry formed on one side and said lines formed on the opposite side.

13. The assembly as defined in claim 1 wherein the encapsulant is a polyurethane.

14. The assembly as defined in claim wherein the encapsulant is an epoxy.

15. The assembly as defined in claim 1 wherein said line means are formed of discrete conductive particles disposed in a solidified matrix of material.

16. The assembly as defined in claim wherein said electronic assembly includes pin means to supply input-/output signals and power.

17. The assembly as defined in claim 1 wherein said barrier includes connector means to provide connection and flat cable means for input/output signals and power.

18. The assembly as defined in claim further characterized by means to detect optical input/output signals.

19. The assembly as defined in claim 18 further characterized by said means to detect optical input/output signals including photoelectric energy conversion means.

* * * * *